T. Hanson,
Hydraulic Engine,
№ 16,686. Patented Feb. 24, 1857.
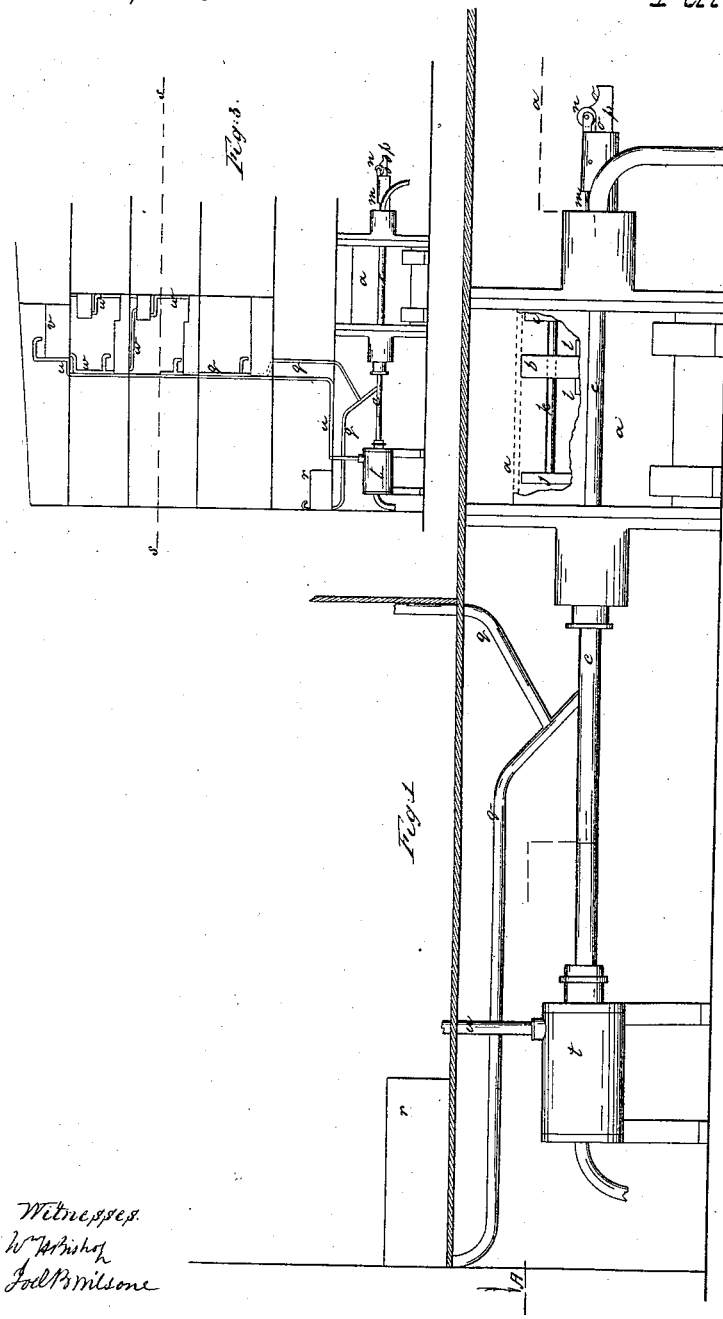
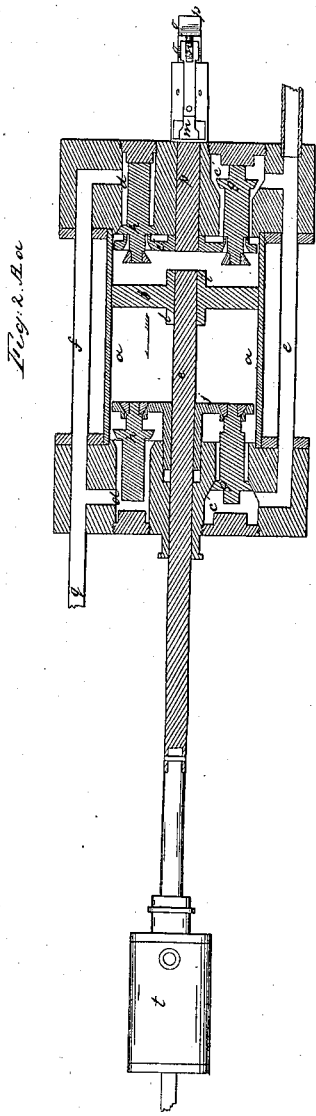
Witnesses.
W. H. Bishop
Joel B. Wilson
Inventor
Thomas Hanson

UNITED STATES PATENT OFFICE.

THOMAS HANSON, OF NEW YORK, N. Y.

APPARATUS FOR SUPPLYING THE UPPER STORIES OF HOUSES WITH WATER.

Specification of Letters Patent No. 16,686, dated February 24, 1857.

*To all whom it may concern:*

Be it known that I, THOMAS HANSON, of the city, county, and State of New York, have invented new and useful Improvements in the Apparatus for Supplying Water to Buildings; and I do hereby declare that the following is a full, clear, and exact description thereof, reference being had to the accompanying drawings, making part of this specification, in which—

Figure 1 is an elevation of the apparatus with a portion of the cylinder in section to exhibit the rod ($k$); Fig. 2 is a horizontal section taken at the line A, $a$, of Fig. 1; and Fig. 3 is an elevation of the apparatus in a building represented in section and on a smaller scale.

The same letters indicate like parts in all the figures.

In the elevated parts of the city of New York and other cities supplied with water from a reservoir or reservoirs serious inconvenience has been experienced in supplying water to the upper stories of buildings on elevated positions. And the object of my invention is to pump water into a reservoir or reservoirs in the upper part of buildings for the supply of the upper stories, by drawing water for the supply of the lower stories. And my said invention consists in the employment of a hydraulic engine operated by the power of a head of water, and which said engine operates a force or other suitable pump to supply water through a connecting pipe or pipes to a suitable reservoir or reservoirs in the upper part of the building, when the said hydraulic engine is combined with, and interposed between the street main or other pipe which receives water from the head, and the pipe or pipes and cock or cocks which supply water to the lower story or stories of the building, by means of which combination when any cock or cocks is or are opened to draw water for use in the lower stories the pressure of the head, in giving the required supply will operate the engine and put in action the pump to supply water to the reservoir in the upper part of the building at some elevation above the level of the actuating head or supply column.

In the accompanying drawings ($a$) represents a cylinder fitted in any suitable manner with a piston ($b$) suitably packed; the rod ($c$) of which passes through a stuffing box in one head of the cylinder to form the connection with the pump in manner to be presently described. On the outside of each head of the cylinder there are two chambers one an induction chamber ($c'$) and the other an eduction chamber ($d$); and the induction chambers at each end are connected by a side pipe or water way ($e$) and in like manner the two eduction chambers are connected together by another side pipe or water way ($f$). And in each head there are two ports an induction port leading from the induction chamber to the inside of the cylinder, and an eduction port leading from the cylinder into the eduction chamber. These ports are provided with suitable valves, the induction valves ($g$) shutting against the outer face of the heads and the eduction valves ($h$) against the inner face of the heads. The valves have a stem extending into the cylinder by which they are secured, the two at one end to a plate ($i$) inside of the cylinder and the two at the other end to a corresponding plate ($j$). In this way the induction and eduction valves at each end are connected to work together so that when the induction valve at one end is opened the eduction valve at the same end is closed and vice versa.

The two plates ($i$) and ($j$) at opposite ends are connected together by a rod ($k$) which passes through a suitable packed hole in the piston so that when the induction valve at one end is opened the induction valve at the other end shall be closed; and so with the eduction valves. The valves are operated by the reciprocating motion of the piston which has a central boss ($l$) on each face which toward the end of each stroke strikes one of the valve plates either ($i$) or ($j$) and to force the said plate toward the head to close the eduction valve at that end and open the induction valve that water may enter to force back the piston, this motion of the valves at one end imparting the reversed operation to the valves at the other end by the rod ($k$) to close the induction and open the eduction valve.

The motions of the piston only start the motions of the valve which is completed by the tension of a spring ($m$) that carries on its outer end a roller ($n$) to act on two opposite inclined planes ($o$) on a rod ($p$) attached to the valve plate ($i$) and which passes through a suitable stuffing box in the head of the cylinder. Now it will be seen that so soon as the piston strikes one of the valve plates and moves it far enough to bring the summit of the two inclined planes beyond the center of the roller, the tension of the spring acting on the opposite inclined plane forces the rod with the plates and valves forward or back, as the case may be to complete the motion of the valves before the piston completes its stroke, and thereby reverse the flow of water to arrest the momentum of the piston and finally reverse it. In this way the supply of water from the head acts on and impels the piston alternately in opposite directions while at the same time the water from the head or street main passes through the engine and escapes from the eduction chamber which is connected by a pipe ($q$) leading to the kitchen sink ($r$) or alone or by its branches to any other part of the building as high as the pressure of the head will admit.

The line ($s$) in the drawing indicates the water level to which the water will rise by the pressure of the head after passing through the engine. This water level may be higher or lower depending on the head of water in any particular locality.

From the foregoing it will be seen that the moment any cock in the pipe ($q$), or any of its branches, is opened to draw water for any purpose the engine must be put in action and stopped when the cock is closed.

The opposite end of the piston rod ($c$) of the engine passes through a suitable stuffing box in the head of a pump cylinder ($t$) and is connected to any suitable pump piston. This pump is provided in any suitable manner with valves, and the induction pipe is to be connected in any suitable or well known manner either with the street pipe or head or with the pipe leading from the eduction pipes of the engine, and the eduction of the said pump is connected by a pipe ($u$) or pipes, with a reservoir or reservoirs or tanks ($v$) in the upper part of the house above the water level. From this it will be seen that whenever water is drawn for use in the lower part of the house the engine and pump are put in operation by which water is carried up to supply the reservoir or reservoirs in the upper part of the building and from this reservoir or reservoirs pipes ($w$) extend in any suitable manner to supply water to the several apartments in the usual manner.

It will be obvious from the foregoing that by connecting an index and suitable appendages to the engine or any part working in unison with it the quantity of water that passes through the cylinder will be measured and recorded and thus answer as a meter.

I have not specially described the construction of the pump nor of the distribution of the pipes, as these may be greatly varied within the range of my invention. And although I have given a more full, clear, and exact description of the engine I do not wish to be understood as making claim to such arrangement of the said engine under this application as other engines may be substituted for the one described, and I contemplate making application for Letters Patent for the said arrangement under a separate and distinct application.

What I claim as my invention and desire to secure by Letters Patent is—

The combination of a hydraulic engine with, and interposed between, the supply pipe from the street main, receiving water from a head, and the house pipe or pipes and cock or cocks for supplying water to the lower story or stories of a house by the force of the said head, and the pump operated by the said engine, and receiving water from the same head and discharging it into a reservoir or reservoirs for the supply of the upper stories of the house, substantially as and for the purpose specified.

THOMAS HANSON.

Witnesses:
W M. H. BISHOP,
JOEL B. WILSON.